(12) United States Patent
Li et al.

(10) Patent No.: US 8,790,449 B2
(45) Date of Patent: Jul. 29, 2014

(54) ELECTRET WEBS WITH CHARGE-ENHANCING ADDITIVES

(75) Inventors: Fuming B. Li, Woodbury, MN (US); John M. Sebastian, Oakdale, MN (US); Marvin E. Jones, Grant, MN (US); Daniel A. Japuntich, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 385 days.

(21) Appl. No.: 13/262,165

(22) PCT Filed: Mar. 23, 2010

(86) PCT No.: PCT/US2010/028290
§ 371 (c)(1),
(2), (4) Date: Sep. 29, 2011

(87) PCT Pub. No.: WO2010/114742
PCT Pub. Date: Oct. 7, 2010

(65) Prior Publication Data
US 2012/0017910 A1      Jan. 26, 2012

Related U.S. Application Data

(60) Provisional application No. 61/166,390, filed on Apr. 3, 2009.

(51) Int. Cl.
*B03C 3/28* (2006.01)

(52) U.S. Cl.
USPC ............ 96/66; 55/528; 55/DIG. 39; 95/59; 264/423; 264/455; 264/466; 264/469; 442/111; 442/115; 442/351; 442/400

(58) Field of Classification Search
CPC ............... B01D 39/163; B10D 2239/0435; A62B 23/025
USPC .......................................... 96/66
See application file for complete search history.

(56) References Cited

U.S. PATENT DOCUMENTS

| | | |
|---|---|---|
| 3,925,376 A | 12/1975 | Chalmers |
| 3,971,373 A | 7/1976 | Braun |
| 4,100,324 A | 7/1978 | Anderson |
| 4,118,531 A | 10/1978 | Hauser |
| 4,215,682 A | 8/1980 | Kubik |
| 4,264,750 A | 4/1981 | Anand |
| RE30,782 E | 10/1981 | Turnhout |
| 4,375,718 A | 3/1983 | Wadsworth |
| RE31,285 E | 6/1983 | Turnhout |
| 4,429,001 A | 1/1984 | Kolpin |
| 4,508,781 A | 4/1985 | Yagi |
| 4,536,440 A | 8/1985 | Berg |
| 4,557,945 A | 12/1985 | Yagi |
| 4,588,537 A | 5/1986 | Klaase |
| RE32,171 E | 6/1986 | Turnhout |
| 4,592,815 A | 6/1986 | Nakao |
| 4,652,282 A | 3/1987 | Ohmori |
| 4,789,504 A | 12/1988 | Ohmori |
| 5,057,710 A | 10/1991 | Nishiura |
| 5,401,446 A | 3/1995 | Tsai |
| RE35,062 E | 10/1995 | Brostrom |
| 5,496,507 A | 3/1996 | Angadjivand |
| 5,908,598 A | 6/1999 | Rousseau |
| 5,919,847 A | 7/1999 | Rousseau |
| 5,968,635 A | 10/1999 | Rousseau |
| 5,976,208 A | 11/1999 | Rousseau |
| 6,123,752 A | 9/2000 | Wu |
| 6,133,414 A | 10/2000 | Pfaendner |
| 6,213,122 B1 | 4/2001 | Rousseau |
| 6,214,094 B1 | 4/2001 | Rousseau |
| 6,238,466 B1 | 5/2001 | Rousseau |
| 6,268,495 B1 | 7/2001 | Rousseau |
| 6,365,088 B1 | 4/2002 | Knight |
| 6,397,458 B1 | 6/2002 | Jones |
| 6,398,847 B1 | 6/2002 | Jones |
| 6,406,657 B1 | 6/2002 | Eitzman |
| 6,409,806 B1 | 6/2002 | Jones |
| 6,419,871 B1 | 7/2002 | Ogale |
| 6,432,175 B1 | 8/2002 | Jones |
| 6,454,986 B1 | 9/2002 | Eitzman |
| 6,562,112 B2 | 5/2003 | Jones |
| 6,620,892 B1 | 9/2003 | Bertin |
| 6,660,210 B2 | 12/2003 | Jones et al. |

(Continued)

FOREIGN PATENT DOCUMENTS

| EP | 1019173 | 7/2008 |
|---|---|---|
| EP | 845554 | 11/2009 |

(Continued)

OTHER PUBLICATIONS

Brown,"Air Filtration", Pergamon Press, 1993, Title, Publication and Table of Contents, 10 pgs.

Brown, "Capture of Dust Particles in Filters by Line-Dipole Charged Fibers", Journal of Aerosol Science, 1981, vol. 12, No. 4, pp. 349-356.

Davies,"The Separation of Airborne Dust and Particles," Institution of Mechanical Engineers, Proceedings 1B, 1952, pp. 185-213.

Macosko, Rheology: Principles, Measurements, and Applications (Wiley, John and Sons, Inc., 1994), p. 242, equation 6.2.12.

Neri, "Reaction of hals in polypropylene during light exposure: Part 1-iso-octane as reaction model compound-", Die Angewandte Makromolekulare Chemie (currently known as: Macromolecular Materials and Engineering)(3871), 1994, vol. 216, pp. 101-112.

(Continued)

*Primary Examiner* — Duane Smith
*Assistant Examiner* — Joubert X Glover
(74) *Attorney, Agent, or Firm* — Jeffrey M. Olofson

(57) ABSTRACT

Electret webs are presented which include a blend of a thermoplastic resin and a charge-enhancing additive. The charge-enhancing additives include a heterocyclic imide material which is free of fluorinated groups. The webs prepared from the blends may be in the form of films or non-woven fibrous webs. Non-woven microfiber webs are useful as filtration media.

20 Claims, No Drawings

(56) References Cited

U.S. PATENT DOCUMENTS

| | | |
|---|---|---|
| 6,808,551 B2 | 10/2004 | Jones |
| 6,893,990 B2 * | 5/2005 | Myers et al. ............ 442/414 |
| 6,969,484 B2 | 11/2005 | Horiguchi |
| 7,244,291 B2 | 7/2007 | Spartz |
| 7,244,292 B2 | 7/2007 | Kirk |
| 7,390,351 B2 | 6/2008 | Leir |
| 7,765,698 B2 | 8/2010 | Sebastian |
| 2002/0174869 A1 | 11/2002 | Gahan |
| 2003/0134515 A1 | 7/2003 | David |
| 2004/0096161 A1* | 5/2004 | Yamaguchi et al. ...... 385/40 |
| 2007/0180997 A1 | 8/2007 | Leir |
| 2007/0200272 A1 | 8/2007 | Horst |
| 2007/0208112 A1 | 9/2007 | Schambony |
| 2008/0045662 A1 | 2/2008 | Roth |
| 2009/0293279 A1 | 12/2009 | Sebastian |
| 2011/0137082 A1 | 6/2011 | Li |
| 2011/0154987 A1 | 6/2011 | Li |

FOREIGN PATENT DOCUMENTS

| | | |
|---|---|---|
| JP | 2002-115177 | 4/2002 |
| JP | 2002-115178 | 4/2002 |
| JP | 2002-161467 | 6/2002 |
| JP | 2002-161471 | 6/2002 |
| JP | 2002-173866 | 6/2002 |
| JP | 2002-339232 | 11/2002 |
| JP | 2003-013359 | 1/2003 |
| JP | 2004-060110 | 2/2004 |
| JP | 2005-131484 | 5/2005 |
| JP | 2005-131485 | 5/2005 |
| JP | 3780916 | 5/2006 |
| WO | WO 97-07272 | 2/1997 |
| WO | WO 99/16532 * | 1/1998 |
| WO | 99/16532 | 4/1999 |
| WO | WO 01-07144 | 2/2001 |
| WO | WO 2009-148744 | 12/2009 |
| WO | WO 2010-114820 | 10/2010 |

OTHER PUBLICATIONS

Otani, "Initial Collection Efficiency of Electret Filter and Its Durability for Solid and Liquid Particles", Journal of Chemical Engineering Japan, 1993, vol. 11, pp. 207-214.

Waker, "Application of Cavity Theory to the Discharge of Electrostatic Dust Filters by x-Rays", Applied Radiation and Isotopes, 1988, vol. 39, No. 7, pp. 677-684.

Wente, "Manufacture of Superfine Organic Fibers", Naval Research Laboratories Report No. 4364, May 25, 1954, pp. 1-17.

Wente, "Superfine Thermoplastic Fibers," Industrial Engineering Chemistry, Aug. 1956, vol. 48, No. 8, pp. 1342-1346.

International Search Report for PCT/US2010/028290, mailed Oct. 28, 2010, 4 pages.

International Search Report for PCT/US2010/029157, mailed Nov. 12, 2010, 3 pages.

* cited by examiner

ELECTRET WEBS WITH CHARGE-ENHANCING ADDITIVES

CROSS REFERENCE TO RELATED APPLICATIONS

This application is a national stage filing under 35 U.S.C. 371 of PCT/US2010/028290, filed Mar. 23, 2010, which claims priority to U.S. Patent Application No. 61/166,390, filed Apr. 3, 2009, the disclosure of which is incorporated by reference in its/their entirety herein.

FIELD OF THE DISCLOSURE

This disclosure relates to electret webs, including non-woven fibrous webs such as non-woven thermoplastic microfiber webs, containing charge-enhancing additives and uses thereof.

BACKGROUND

An electret is a dielectric material that exhibits a quasi-permanent electrical charge. Electrets are useful in a variety of devices including, e.g. cling films, air filters, filtering facepieces, and respirators, and as electrostatic elements in electro-acoustic devices such as microphones, headphones, and electrostatic recorders.

The performance of microfibrous webs used for aerosol filtration can be improved by imparting an electrical charge to the fibers, forming an electret material. In particular, electrets are effective in enhancing particle capture in aerosol filters. A number of methods are known for forming electret materials in microfibrous webs. Such methods include, for example, bombarding melt-blown fibers as they issue from the die orifices, as the fibers are formed, with electrically charged particles such as electrons or ions. Other methods include, for example, charging the fibers after the web is formed, by means of a DC corona discharge or imparting a charge to the fiber mat by means of carding and/or needle tacking (tribocharging). Recently, a method in which jets of water or a stream of water droplets impinge on a non-woven web at a pressure sufficient to provide filtration enhancing electret charge has been described (hydrocharging).

SUMMARY

The need remains for electret webs with improved properties. Presented in this disclosure are electret webs containing charge-enhancing additives. These charge enhancing additives provide electret webs that are easy to charge by a variety of different charging mechanisms such as tribocharging, DC corona discharge, hydrocharging or a combination thereof.

In some embodiments the disclosure includes an electret web comprising a thermoplastic resin and a charge-enhancing additive comprising a heterocyclic imide material which is free of fluorinated groups. The electret web may be in the form of a non-woven fibrous web or even a non-woven microfiber web.

In other embodiments the disclosure includes an electret filter media comprising a non-woven microfiber web comprising a blend of a thermoplastic resin and a charge-enhancing additive comprising a heterocyclic imide material which is free of fluorinated groups. The electret filter media may comprise a respirator filter, a room ventilation system filter, a vehicle ventilation system filter, an air conditioner filter, a furnace filter, a room air purifier filter, a vacuum cleaner filter, or a computer disk drive filter.

Also disclosed are methods for preparing an electret web comprising providing a thermoplastic material, providing a hot melt processable charge-enhancing additive comprising a heterocyclic imide material which is free of fluorinated groups, hot melt mixing the thermoplastic material and the charge-enhancing additive to form a blend, forming a web from the hot melt blend, and electrostatically charging the web.

DETAILED DESCRIPTION

Electret webs useful in the present disclosure include a blend of a thermoplastic resin and a charge-enhancing additive. Webs prepared from such blends can show enhanced properties over webs prepared with the thermoplastic resins alone. Useful charge-enhancing additives include heterocyclic imide materials which are free of fluorinated groups.

The electret webs may be in a variety of forms. For example the web may be a continuous or discontinuous film, or a fibrous web. Fibrous webs are particularly useful for the formation of filtration media. In some embodiments the web is a non-woven microfibrous web. Typically microfibers are 1-100 micrometers, or more typically 2-30 micrometers in effective diameter (or average diameter if measured by a method such as scanning electron microscopy) and the microfibers need not have a circular cross-section.

The terms "a", "an", and "the" are used interchangeably with "at least one" to mean one or more of the elements being described.

The term electret refers to a material that exhibits a quasi-permanent electric charge. The electric charge may be characterized by the X-ray Discharge Test as described in the examples section.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl (t-butyl), n-pentyl, n-hexyl, cyclohexyl, n-heptyl, n-octyl, and ethylhexyl.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkynyl" refers to a monovalent group that is a radical of an alkyne, which is a hydrocarbon with at least one carbon-carbon triple bond. The alkynyl can be linear, branched, cyclic, or combinations thereof and typically contains 2 to 20 carbon atoms. In some embodiments, the alkynyl contains 2 to 18, 2 to 12, 2 to 10, 4 to 10, 4 to 8, 2 to 8, 2 to 6, or 2 to 4 carbon atoms. Exemplary alkynyl groups include ethynyl, n-propynyl, and n-butynyl.

The term "heteroalkyl" refers to an alkyl group which contains heteroatoms. These heteroatoms may be pendant atoms, for example, halogens such as fluorine, chlorine, bromine, or iodine or catenary atoms such as nitrogen, oxygen or sulfur. An example of a heteroalkyl group is a polyoxyalkyl group such as $-CH_2CH_2(OCH_2CH_2)_nOCH_2CH_3$.

The term "substituted alkyl" refers to an alkyl group which contains substituents along the hydrocarbon backbone. These substituents may be alkyl groups, heteroalkyl groups or aryl groups. An example of a substituted alkyl group is a benzyl group.

The term "aryl" refers to an aromatic carbocyclic group that is a radical containing 1 to 5 rings which may be connected or fused. The aryl group may be substituted with alkyl or heteroalkyl groups. Examples of aryl groups include phenyl groups, naphthalene groups and anthracene groups.

The term "alkylene" refers to a divalent group that is a radical of an alkane, which is a saturated hydrocarbon. The alkylene can be linear, branched, cyclic, or combinations thereof and typically has 1 to 20 carbon atoms. In some embodiments, the alkylene group contains 1 to 18, 1 to 12, 1 to 10, 1 to 8, 1 to 6, or 1 to 4 carbon atoms. Examples of alkylene groups include, but are not limited to, methylene (—CH$_2$—), ethylene (—CH$_2$CH$_2$—), and the like. The alkylene group can also be substituted with alkyl groups.

The term "arylene" refers to a divalent aromatic carbocyclic group that is a radical containing 1 to 5 rings which may be connected or fused. The arylene group may be substituted with alkyl or heteroalkyl groups. Examples of arylene groups include phenylene groups, naphthylene groups and anthrylene groups.

The term "aralkylene" refers to a divalent group of formula —R$^a$—Ar$^a$— where R$^a$ is an alkylene and Ar$^a$ is an arylene (i.e., an alkylene is bonded to an arylene).

The term "heterocyclic imide" refers to a heterocyclic group, i.e. a cyclic group in which the ring structure contains hetero atoms as well as carbon and hydrogen atoms, that is a radical containing 1 to 5 rings which may be connected or fused, and is substituted with at least one imide group. An imide group is one with the structure —C(O)—NR$^a$—C(O)— where C(O) refers to a carbonyl group (C=O) and where the group R$^a$ is hydrogen, alkyl, alkenyl, alkynyl, aryl, heteroalkyl, or substituted alkyl. Examples of heterocyclic imides include maleimides, phthalimides, succinimides and the like. "Heterocyclic imide materials" are materials which contain at least one heterocyclic imide.

The term "hindered amine" refers to amine groups which are sterically hindered by substituent groups. Examples of hindered amines are described, for example, in U.S. Pat. No. 3,925,376 (Chalmers et al.).

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The terms "room temperature" and "ambient temperature" are used interchangeably to mean temperatures in the range of 20° C. to 25° C.

The term "hot melt processable" as used herein, refers to a composition that can transform, for example, by heat and pressure from a solid to a viscous fluid. The composition should be capable of being hot melt processed without being substantially chemically transformed, degraded or rendered unusable for the intended application.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Thermoplastic resins useful in the present disclosure include any thermoplastic nonconductive polymer capable of retaining a high quantity of trapped electrostatic charge when formed into a web and charged. Typically, such resins have a DC (direct current) resistivity of greater than $10^{14}$ ohm-cm at the temperature of intended use. Polymers capable of acquiring a trapped charge include polyolefins such as polypropylene, polyethylene, and poly-4-methyl-1-pentene; polyvinyl chloride; polystyrene; polycarbonates; polyesters, including polylactides; and perfluorinated polymers and copolymers. Particularly useful materials include polypropylene, poly-4-methyl-1-pentene, blends thereof or copolymers formed from at least one of propylene and 4-methyl-1-pentene.

Generally, useful thermoplastic polymers are characterized by the description "melt flow index". The Melt Flow Index (MFI) is a measure of the ease of flow of the melt of a thermoplastic polymer. It is defined as the mass of polymer in grams flowing in 10 minutes through a capillary of specific diameter and length by a pressure applied via prescribed alternative gravimetric weights for alternative prescribed temperatures. The method is given in ASTM D1238 and ISO 1133. Typically the melt flow index for polypropylene is measured at 230° C.

Examples of suitable thermoplastic resins include, for example, the polypropylene resins: ESCORENE PP 3746G commercially available from Exxon-Mobil Corporation, Irving, Tex.; TOTAL PP3960, TOTAL PP3860, and TOTAL PP3868 commercially available from Total Petrochemicals USA Inc., Houston, Tex.; and METOCENE MF 650W commercially available from LyondellBasell Industries, Inc., Rotterdam, Netherlands; and the poly-4-methyl-1-pentene resin TPX-MX002 commercially available from Mitsui Chemicals, Inc., Tokyo, Japan.

The charge-enhancing additives are heterocyclic imide materials that are free of fluorinated groups. A number of charge-enhancing additives have been utilized which contain fluorinated groups, but the use of fluorinated groups may be undesirable. The use of fluorinated groups, especially perfluorinated groups, requires the use of expensive and not readily available fluorine-containing reagents and can involve complicated reaction sequences and processing steps.

The heterocyclic imide materials can be described by three general structures, Formula 1, Formula 2 and Formula 3 shown below:

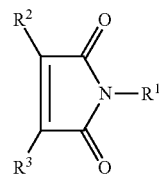

Formula 1

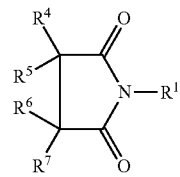

Formula 2

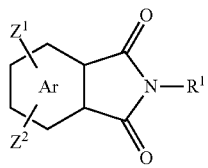

Formula 3

In Formula 1, the group $R^1$ is hydrogen, alkyl, aryl, heteroalkyl, or substituted alkyl or substituted aryl. Additionally, $R^1$ may be attached to an additional heterocyclic imide group. The groups $R^2$ and $R^3$ are independently hydrogen, alkyl, aryl, heteroalkyl, or substituted alkyl or substituted aryl or may be linked to another heterocyclic imide. In Formula 2, the group $R^1$ is the same as described above. The groups $R^4$, $R^5$, $R^6$ and $R^7$ are independently hydrogen, alkyl, aryl, heteroalkyl, or substituted alkyl or substituted aryl or may be linked to another heterocyclic imide. In Formula 3, the group $R^1$ is the same as described above; the Ar is an aromatic ring such as a phenyl, a naphthalyl, an anthracenyl or other aromatic fused ring structure; $Z^1$ and $Z^2$ are substituents on the aromatic ring that may be located anywhere on the aromatic ring and independently may be hydrogen, alkyl, aryl, heteroalkyl, or substituted alkyl, nitro, substituted aryl or may be linked to another heterocyclic imide. Additionally the aromatic ring may be linked to another heterocyclic imide.

In some embodiments, the charge-enhancing additive is an additive of Formula 1. A variety of different materials that are described by Formula 1 are useful as charge-enhancing additives. Such additives are sometimes referred to as "maleimides" because when $R^1$, $R^2$ and $R^3$ in Formula 1 are hydrogen atoms, the molecule is known as maleimide. Typically the groups $R^2$ and $R^3$ are hydrogen atoms. Suitable maleimides include, for example, maleimides which are linked to another maleimide group. Such maleimides include examples where $R^1$ in Formula 1 is a linking group attached to another maleimide group. Examples of linking groups include alkylene groups, arylene groups, aralkylene groups and the like. In some embodiments the linking group comprises an aromatic linking, meaning that the linking group contains at least one aromatic ring. Examples of aromatic linking groups include, for example, arylene groups (—Ar—), and a variety of aralkylene groups which may be linked through either an aryl group or an alkyl group such as for example —Ar—$R^8$—Ar—, and —$R^9$—Ar—$R^9$— where $R^8$ and $R^9$ are alkylene groups and Ar represents an arylene group. In some embodiments the charge-enhancing additive comprises the structure of Formula 4 or Formula 5 (below).

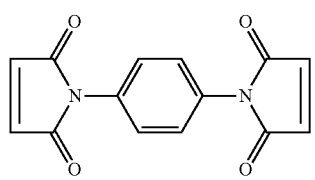

Formula 4

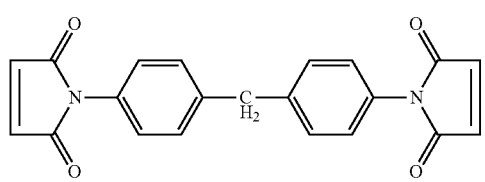

Formula 5

In some embodiments, the charge-enhancing additive is an additive of Formula 2. A variety of different materials that are described by Formula 2 are useful as charge-enhancing additives. Such additives are sometimes referred to as "succinimides" because when $R^1$, $R^4$, $R^5$, $R^6$ and $R^7$ in Formula 2 are hydrogen atoms, the molecule is known as succinimide. Suitable succinimides include, for example, succinimides of Formula 2 where $R^1$ comprises an alkyl, aryl, heteroalkyl, substituted alkyl or substituted aryl. The $R^4$, $R^5$, $R^6$ and $R^7$ groups can be alkyl, or aryl groups or they may be linking groups that link the succinimide group to other succinimide groups. In some desirable embodiments, the charge enhancing additive is a succinimide of Formula 2 where $R^1$ comprises a hindered amine group, the $R^4$ and $R^6$ groups are linking groups that link the succinimide group to other succinimide groups, and the $R^3$ and $R^5$ groups are hydrogens. In a particularly suitable embodiment, the charge-enhancing additive is commercially available as "UVINUL 5050H" from BASF, Ludwigshafen, Germany, which may be described as a hindered amine N-substituted succinimide oligomer. The structure of this additive is shown in Formula 6 (below) where the molecular weight is reported to be 3,000-4,000 grams/mole and the value of n is therefore about 5-7.

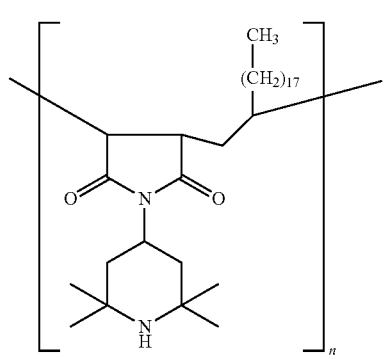

Formula 6

In some embodiments, the charge-enhancing additive is an additive of Formula 3. A variety of different materials that are described by Formula 3 are useful as charge-enhancing additives. Additives of Formula 3 may be viewed as maleimides fused to aryl groups. One suitable class of such materials are sometimes referred to as "phthalimides" because when $R^1$, $Z^1$ and $Z^2$ in Formula 3 are hydrogen atoms, and the Ar group is a phenyl ring, the molecule is known as phthalimide. Suitable phthalimides include, for example, phthalimides of Formula 3 where $R^1$ comprises an alkyl, aryl, heteroalkyl, substituted alkyl or substituted aryl. The $Z^1$ and $Z^2$ groups can independently be hydrogen, alkyl, aryl, or nitro groups. In some desirable embodiments, the charge enhancing additive is a phthalimide of Formula 3 where $R^1$ comprises an aryl group such as a phenyl group, and one of the $Z^1$ and $Z^2$ groups is a hydrogen atom and the other is nitro group. An example of a suitable phthalimide is shown in Formula 7 (below).

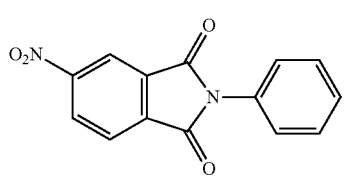

Formula 7

Typically the charge-enhancing additive is present in a thermoplastic resin and charge-enhancing additive blend in amounts of up to about 10%, more typically in the range of 0.1 to 5% by weight based upon the total weight of the blend. In some embodiments, the charge-enhancing additive is present in an amount ranging from 0.1 to 3% by weight or 0.25 to 2% by weight.

The blend of the thermoplastic resin and the charge-enhancing additive can be prepared by well-known methods. Typically, the blend is processed using melt extrusion techniques, so the blend may be preblended to form pellets in a batch process, or the thermoplastic resin and the charge-enhancing additive may be mixed in the extruder in a continuous process. Where a continuous process is used, the thermoplastic resin and the charge-enhancing additive may be pre-mixed as solids or added separately to the extruder and allowed to mix in the molten state.

Examples of melt mixers that may be used to form preblended pellets include those that provide dispersive mixing, distributive mixing, or a combination of dispersive and distributive mixing. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

Examples of extruders that may be used to extrude preblended pellets prepared by a batch process include the same types of equipment described above for continuous processing. Useful extrusion conditions are generally those which are suitable for extruding the resin without the additive.

The extruded blend of thermoplastic resin and charge-enhancing additive may be cast or coated into films or sheets or may be melt-blown into non-woven fibrous webs using known techniques. Melt-blown, non-woven microfibrous webs are particularly useful as filtration media.

Melt-blown, non-woven microfibrous electret filters are especially useful as an air filter element of a respirator, such as a filtering facepiece, or for such purposes as home and industrial air-conditioners, air cleaners, vacuum cleaners, medical air line filters, and air conditioning systems for vehicles and common equipment, such as computers, computer disk drives and electronic equipment. In some embodiments, the electret filters are combined with a respirator assembly to form a respiratory device designed to be used by a person. In respirator uses, the electret filters may be in the form of molded, pleated, or folded half-face respirators, replaceable cartridges or canisters, or prefilters.

Melt-blown microfibers useful in the present disclosure can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al.

Useful melt-blown microfibers for fibrous electret filters typically have an effective fiber diameter of from about 1-100 micrometers, more typically 2 to 30 micrometers, in some embodiments from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only blown microfibers. Generally, no more than about 90 weight percent staple fibers are present, more typically no more than about 70 weight percent. Examples of webs containing staple fiber are disclosed in U.S. Pat. No. 4,118,531 (Hauser).

Sorbent particulate material such as activated carbon or alumina may also be included in the web. Such particles may be present in amounts up to about 80 volume percent of the contents of the web. Examples of particle-loaded webs are described, for example, in U.S. Pat. No. 3,971,373 (Braun), U.S. Pat. No. 4,100,324 (Anderson) and U.S. Pat. No. 4,429,001 (Kolpin et al.).

Various optional additives can be blended with the thermoplastic composition including, for example, pigments, light stabilizers, primary and secondary antioxidants, metal deactivators, hindered amines, hindered phenols, fatty acid metal salts, triester phosphites, phosphoric acid salts, fluorine-containing compounds and combinations thereof. In addition, other charge-enhancing additives may be combined with the thermoplastic composition. Possible charge additives include thermally stable organic triazine compounds or oligomers, which compounds or oligomers contain at least one nitrogen atom in addition to those in the triazine ring, see, for example, U.S. Pat. Nos. 6,268,495, 5,976,208, 5,968,635, 5,919,847, and 5,908,598 to Rousseau et al. Another additive known to enhance electrets is "CHIMASSORB 944 LF: (poly[[6-(1,1,3,3,-tetramethylbutyl)amino]-s-triazine-2,4-diyl][[(2,2,6,6-tetramethyl-4-piperidyl)imino]hexamethylene[(2,2,6,6-tetramethyl-4-piperidyl)imino]]), available from Ciba Specialty Chemicals, Inc. The charge-enhancing additives may be N-substituted amino aromatic compounds, particularly triamino substituted compounds, such as 2,4,6-trianilino-p-(carbo-2'-ethylhexyl-1'-oxy)-1,3,5-triazine commercially available as "UVINUL T-150" from BASF, Ludwigshafen, Germany. Another charge additive is 2,4,6-tris-(octadecylamino)-triazine, also known as tristearyl melamine ("TSM"). Further examples of charge-enhancing additives are provided in U.S. Patent Application Ser. No. 61/058,029, U.S. Patent Application Ser. No. 61/058,041, U.S. Pat. No. 7,390,351 (Leir et al.), U.S. Pat. No. 5,057,710 (Nishiura et al.), and U.S. Pat. Nos. 4,652,282 and 4,789,504 (Ohmori et al.).

In addition the web may be treated to chemically modify its surface. Surface fluorination can be achieved by placing a polymeric article in an atmosphere that contains a fluorine-containing species and an inert gas and then applying an electrical discharge to modify the surface chemistry of the polymeric article. The electrical discharge may be in the form of a plasma such as an AC corona discharge. This plasma fluorination process causes fluorine atoms to become present on the surface of the polymeric article. The plasma fluorination process is described in a number of U.S. Pat. Nos. 6,397,458, 6,398,847, 6,409,806, 6,432,175, 6,562,112, 6,660,210, and 6,808,551 to Jones/Lyons et al. Electret articles that have a high fluorosaturation ratio are described in U.S. Pat. No. 7,244,291 to Spartz et al., and electret articles that have a low fluorosaturation ratio, in conjunction with heteroatoms, is described in U.S. Pat. No. 7,244,292 to Kirk et al. Other publications that disclose fluorination techniques include: U.S. Pat. Nos. 6,419,871, 6,238,466, 6,214,094, 6,213,122, 5,908,598, 4,557,945, 4,508,781, and 4,264,750; U.S. Publications US 2003/0134515 A1 and US 2002/0174869 A1; and International Publication WO 01/07144.

The electret filter media prepared according to the present disclosure generally have a basis weight (mass per unit area) in the range of about 10 to 500 g/m$^2$, and in some embodiments, about 10 to 100 g/m$^2$. In making melt-blown microfiber webs, the basis weight can be controlled, for example, by changing either the collector speed or the die throughput. The thickness of the filter medium is typically about 0.25 to 20 millimeters, and in some embodiments, about 0.5 to 2 millimeters. Multiple layers of fibrous electret webs are commonly used in filter elements. The solidity of the fibrous electret web typically is about 1% to 25%, more typically about 3% to 10%. Solidity is a unitless parameter that defines the solids fraction of the web. Generally the methods of this disclosure provide electret webs with generally uniform charge distribution throughout the web without regard to basis weight, thickness, or solidity of the medium. The electret filter medium and the resin from which it is produced should not be subjected to any unnecessary treatment which might increase its electrical conductivity, e.g., exposure to ionizing radiation, gamma rays, ultraviolet irradiation, pyrolysis, oxidation, etc.

The electret web may be charged as it is formed or the web may be charged after the web is formed. In electret filter media, the medium is generally charged after the web is formed. In general, any standard charging method known in the art may be used. For example, charging may be carried out in a variety of ways, including tribocharging, DC corona discharge and hydrocharging. A combination of methods may also be used.

Examples of suitable DC corona discharge processes are described in U.S. Pat. Re. No. 30,782 (van Turnhout), U.S. Pat. Re. No. 31,285 (van Turnhout), U.S. Pat. Re. No. 32,171 (van Turnhout), U.S. Pat. No. 4,215,682 (Davis et al.), U.S. Pat. No. 4,375,718 (Wadsworth et al.), U.S. Pat. No. 5,401,446 (Wadsworth et al.), U.S. Pat. No. 4,588,537 (Klaase et al.), U.S. Pat. No. 4,592,815 (Nakao), and U.S. Pat. No. 6,365,088 (Knight et al.).

Hydrocharging of the web is carried out by impinging jets of water or a stream of water droplets onto the web at a pressure sufficient to provide the web with filtration enhancing electret charge. The pressure necessary to achieve optimum results varies depending on the type of sprayer used, the type of polymer from which the web is formed, the type and concentration of additives to the polymer, the thickness and density of the web and whether pre-treatment, such as DC corona surface treatment, was carried out prior to hydrocharging. Generally, water pressures in the range of about 10 to 500 psi (69 to 3450 kPa) are suitable. DC corona surface treatment could also be used as a post-hydrocharging treatment, if desired, but such a post-treatment is not typical.

The jets of water or stream of water droplets can be provided by any suitable spray means. An apparatus useful for hydraulically entangling fibers is generally useful in the method of the present disclosure, although operation is carried out at lower pressures in hydrocharging than generally used in hydroentangling. Hydrocharging is understood to include the method described in U.S. Pat. No. 5,496,507 (Angadjivand) and other various derivative methods for imparting an electret charge using the fluid wetting and dewetting process as described in, for example, Japanese Patent Application Number JP 2002161467 (Horiguchi), Japanese Patent Application Number JP 2002173866 (Takeda), Japanese Patent Application Number JP 2002115177 (Takeda), Japanese Patent Application Number JP 2002339232 (Takeda), Japanese Patent Application Number JP 2002161471 (Takeda), Japanese Pat. No. 3,780,916 (Takeda), Japanese Patent Application Number JP 2002115178 (Takeda), Japanese Patent Application Number JP 2003013359 (Horiguchi), U.S. Pat. No. 6,969,484 (Horiguchi), U.S. Pat. No. 6,454,986 (Eitzman), Japanese Patent Application Number JP 2004060110 (Masumori), Japanese Patent Application Number JP 2005131485 (Kodama), and Japanese Patent Application Number JP 2005131484 (Kodama).

The hydrocharging of the web may also be carried out using a new method disclosed in the U.S. patent application entitled "Method of Making Electret Articles Based On Zeta Potential" (U.S. Ser. No. 12/131,770) filed Jun. 2, 2008. The method comprises: (a) providing a polymeric article to be charged; and (b) contacting the polymeric article to be charged with an aqueous liquid that has a pH and conductivity as follows: (i) if the article has a zeta potential of less than −7.5 millivolts (mV), then the contacting water has a conductivity of about 5 to 9,000 microSiemens per centimeter (microS/cm) and a pH greater than 7; and (ii) if the article has a zeta potential of greater than −7.5 mV, then the contacting water has a conductivity of about 5 to 5,500 micro Siemens per centimeter (microS/cm) and a pH of 7 or less. The article may be dried actively (with a vacuum or heat) or passively (hang drying) or combinations thereof.

To assess filtration performance, a variety of filtration testing protocols have been developed. These tests include measurement of the aerosol penetration of the filter web using a standard challenge aerosol such as dioctylphthalate (DOP), which is usually presented as percent of aerosol penetration through the filter web (% Pen) and measurement of the pressure drop across the filter web ($\Delta P$). From these two measurements, a quantity known as the Quality Factor (QF) may be calculated by the following equation:

$$QF = -\ln(\% \text{ Pen}/100)/\Delta P,$$

where ln stands for the natural logarithm. A higher QF value indicates better filtration performance, and decreased QF values effectively correlate with decreased filtration performance. Details for measuring these values are presented in the Examples section. Typically, the filtration media of this disclosure have measured QF values of 0.3 (mm of $H_2O$)$^{-1}$ or greater at a face velocity of 6.9 centimeters per second.

To verify that a particular filter medium is electrostatically charged in nature, one may examine its performance before and after exposure to ionizing X-ray radiation. As described in the literature, for example, *Air Filtration* by R. C. Brown (Pergamon Press, 1993) and "Application of Cavity Theory to the Discharge of Electrostatic Dust Filters by X-Rays", A. J. WAKER and R. C. BROWN, *Applied Radiation and Isotopes*, Vol. 39, No. 7, pp. 677-684, 1988, if an electrostatically charged filter is exposed to X-rays, the penetration of an aerosol through the filter will be greater after exposure than before exposure, because the ions produced by the X-rays in the gas cavities between the fibers will have neutralized some of the electric charge. Thus, a plot of penetration against cumulative X-ray exposure can be obtained which shows a steady increase up to a constant level after which further irradiation causes no change. At this point all of the charge has been removed from the filter.

These observations have led to the adoption of another testing protocol to characterize filtration performance, the X-ray Discharge Test. In this testing protocol, select pieces of the filter medium to be tested are subjected to X-ray radiation to discharge the electret web. One attribute of this test is that it confirms that the web is an electret. Because it is known that X-rays quench electret charge, exposure of a filter media to X-rays and measuring the filter performance before and after this exposure and comparing the filter performances indicates whether the filter media is an electret. If the filter performance is unchanged after exposure to X-ray radiation, that is indicative that no charge was quenched and the material is not an electret. However, if the filter performance diminishes after exposure to X-ray radiation, that is indicative that the filter media is an electret.

When the test is run, typically, the filtration performance is measured before and after exposure of the filter medium to the X-ray radiation. A % Penetration Ratio can be calculated according to the following equation: % Penetration Ratio=(ln(initial % DOP Penetration/100)/(ln(% DOP Penetration after 60 min of X-ray exposure)))×100, when tested according to the Filtration Performance Test Method, as described in the Examples section below. In order for the web to have sufficient charge for use as a filter, the % Penetration Ratio is typically at least 300%. As the % Penetration Ratio increases, the filtration performance of the web also increases. In some embodiments, the % Penetration Ratio is at least 400%, 500%, or 600%. In preferred embodiments, the % Penetration Ratio is at least 750% or 800%. In some embodiments, the web exhibits a % Penetration Ratio of at least 1000%, or at least 1250%.

The initial Quality Factor (prior to exposure to X-rays) is typically at least 0.3 (mm of $H_2O)^{-1}$, more typically at least 0.4 or even 0.5 (mm of $H_2O)^{-1}$ for a face velocity of 6.9 cm/s when tested according to the Filtration Performance Test Method, as described in the Examples section below. In some embodiments, the initial Quality Factor is at least 0.6 or 0.7 (mm of $H_2O)^{-1}$. In other embodiments, the initial Quality Factor is at least 0.8, at least 0.90, at least 1.0, or even greater than 1.0 (mm of $H_2O)^{-1}$. The Quality Factor after 60 minutes exposure to X-rays is typically less than 50% of the initial Quality Factor. In some embodiments, the initial Quality Factor is at least 0.5 (mm of $H_2O)^{-1}$ or greater and the Quality Factor after 60 minutes exposure to X-rays is less than 0.15 (mm of $H_2O)^{-1}$.

The Effective Charge Density ($q_f$) for an electret filter fiber may be calculated from filter penetration test measurements. This calculation is described in Brown, R. C. (1981) Capture of Dust Particles in Filters by Line-Dipole Charged Fibers, J. Aerosol Sci. 12:349-356; and Otani, Y., Emi, H., and Mori, J. (1993), Initial Collection Efficiency of Electret Filter and Its Durability for Solid and Liquid Particles, J. Chem. Eng. Japan 11:207-214.

The equation for filter penetration through an electret filter medium is related to three particle coefficients for mechanical, dipole and coulombic particle capture mechanisms.

$$\% P_{ch} = 100 \left[\frac{\pi(1-\alpha)d_f}{4\alpha L}\right](\eta_M + \eta_{In} + \eta_c),$$

Where:

$\eta_m$=single fiber efficiency: mechanical capture (uncharged fibers, uncharged particles)

$\eta_{In}$=single fiber efficiency: induced dipole capture (charged fibers, uncharged particles)

$\eta_C$=single fiber efficiency: coulombic capture (charged fibers, charged particles)=0 for uncharged particles The induced force single fiber efficiency ($\eta_{In}$) may be calculated from the filter structure and the results of filter tests, using uncharged particles ($\eta_C$=0) for an electret filter medium, which give the penetration fraction for charged fibers ($P_{ch}$) and for uncharged fibers ($P_{unch}$):

$$\eta_{In} = \left[\frac{\pi(1-\alpha)d_f}{4\alpha L}\right]\ln\left[\frac{P_{ch}}{P_{unch}}\right]$$

The Induced Force Dimensionless Parameter ($K_{In}$) relates to the capture of uncharged particles with charged electret fibers.

$$K_{In} = \left[\frac{\varepsilon_p - 1}{\varepsilon_p + 2}\right]\frac{C_c\pi^2 q_f^2 d_p^2}{6\varepsilon_0(1+\varepsilon_f)^2 \mu d_f U_0}$$

Correlative relationships from computational analysis (below) from Otani (1993) and Brown (1993) for two regimes may be inverted to calculate the Induced Force Parameter, $K_{In}$, from $\eta_{In}$ with a correction ($h_k$) for the flow field around fibers. In the case of this study, $K_{In}<1$ and the first equation was used.

$\eta_{In}=0.51 h_k^{-0.35} K_{In}^{0.73}$; $10^{-2}<K_{In}<10^0$ $\eta_{In}=0.54 h_k^{-0.60} K_{In}^{0.40}$; $10^0<K_{In}<10^2$ $h_k=-\frac{1}{2}\ln\alpha+\alpha-\frac{1}{4}\alpha^2-\frac{3}{4}$ Substituting the value from the calculation of $K_{In}$ from $\eta_{In}$ and inverting the equation for $K_{In}$ above gives the Effective Charge Density ($q_f$) of the fibers in an electret filter.

$$q_f = \left\{\left[\frac{\varepsilon_p+2}{\varepsilon_p-1}\right]\frac{6\varepsilon_0(1+\varepsilon_f)^2 \mu d_f U_o K_{In}}{C_c\pi^2 d_p^2}\right\}^{0.5}$$

Where:
$\eta_{In}$=Induced dipole single fiber efficiency (–)
$d_f$=Fiber Diameter (m)=0.5×(Effective Fiber Diameter from airflow tests)
L=Filter thickness (m)
$\alpha$=solidity (–)
$P_{ch}$=Penetration—charged fibers (–)
$P_{unch}$=Penetration—uncharged fibers (–)
$d_p$=Particle Diameter (m)=0.2 micrometer
$C_c$=Particle Cunningham Correction Factor (–)
$h_k$=Kuwabara hydrodynamic factor (–)
$q_f$=Effective Fiber Charge Density (C/m$^2$)
$\varepsilon_p$=Dielectric Constant—Particle (–)=5.1 for dioctylphthalate
$\varepsilon_0$=Free Space Dielectric Constant=8.8542E-12 (C$^2$/Nm$^2$)
$\varepsilon_f$=Dielectric Constant—Fiber (–)=2.2 for polypropylene
$\mu$=Air Viscosity Pa s=1.81E-05 (Ns/m$^2$)
$U_0$=Face Velocity (m/s)=6.9 cm/s
$K_{In}$=Induced Dipole Force Parameter (–)

The input DOP particle size distribution used from the TSI AFT Model 8130 aerosol generator (described below) has a geometric count mean diameter of 0.2 micrometers with a geometric standard deviation of 1.6. The TSI AFT Model 8130 was operated with the aerosol neutralizer turned off. The design of the TSI AFT Model 8130 DOP aerosol generator has a large dead-space volume. The resulting physical and electrostatic agglomeration on this liquid aerosol in the dead-space volume produces an aerosol with a very low bipolar electrostatic charge. This bipolar charge approximates zero as for uncharged particles and is much lower than with the neutralizer turned on (Boltzmann charge distribution).

The count median fiber diameter is used for the calculation of fiber charge. This is calculated as one-half the effective fiber diameter. The effective fiber diameter (EFD) is the surface area fiber diameter and can be related to the fiber count diameter by the Hatch-Choate equation:

$$d_g = \frac{d_a}{\exp(2\ln^2(\sigma_g))}$$

Where:

$d_g$=count geometric mean diameter=arithmetic median diameter $d_a$=area geometric mean diameter=EFD $\sigma_g$=geometric standard deviation Details of the procedure for carrying out the calculation are included in the Examples section, below. In some embodiments, the calculated effective charge density is at least 20 microcoulombs/square meter. In other embodiments the calculated effective charge density is at least 30, 40 or even 50 microcoulombs/square meter.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| Charge Additive-1 | 4-Nitro-N-phenylphthalimide (CAS:40392-27-6) commercially available from TCI America. |
| Charge Additive-2 | N,N'-1,4-Phenylenedimaleimide (CAS:3278-31-7) available from TCI America. |
| Charge Additive-3 | 4,4'-Bismaleimido diphenylmethane (CAS:13676-54-5) available from TCI America. |
| Charge Additive-4 | 1-(2,2,6,6-tetramethyl-piperidin-4-yl)-pyrrolidine-2,5-dione derivative commercially available as "UVINUL 5050H" (CAS:152261-33-1) from BASF, Ludwigshafen, Germany. |
| Charge Additive-5 | N,N'-bisformyl-N,N'-bis(2,2,6,6-tetramethyl-4-piperidinyl)-hexamethylendiamine commercially available as "UVINUL 4050H"(CAS:124172-53-8) from BASF, Ludwigshafen, Germany. |
| PP-1 | Polypropylene resin, ESCORENE PP 3746G (melt flow index 1200), commercially available from Exxon-Mobil Corporation, Irving, TX. |
| PP-2 | Polypropylene resin grade 3, TOTAL PP3960 (melt flow index 350), commercially available from Total Petrochemicals USA Inc., Houston, TX. |
| PP-3 | Polypropylene resin, TOTAL PP3860 (melt flow index 100), commercially available from Total Petrochemicals USA Inc., Houston, TX. |
| PP-4 | Polypropylene resin, METOCENE MF 650W (melt flow index 500), commercially available from LyondellBasell Industries, Inc., Rotterdam, Netherlands |
| PP-5 | Polypropylene resin, TOTAL PP3868 (melt flow index 35), commercially available from Total Petrochemicals USA Inc., Houston, TX. |
| PMP-1 | Poly-4-methyl-1-pentene resin, TPX-MX002, commercially available from Mitsui Chemicals, Inc., Tokyo, Japan |

-continued

Table of Abbreviations

| Abbreviation or Trade Designation | Description |
|---|---|
| DI water | Deionized water |
| PPM | Parts per million |
| BMF | Melt blown microfiber web |

Test Methods

Filtration Testing

The samples were tested for % DOP aerosol penetration (% Pen) and pressure drop (ΔP), and the Quality Factor (QF) was calculated. The filtration performance (% Pen and QF) of the nonwoven microfiber webs were evaluated using an Automated Filter Tester (AFT) Model 8130 (available from TSI, Inc., St. Paul, Minn.) using dioctylphthalate (DOP) as the challenge aerosol. The DOP aerosol is nominally a monodisperse 0.3 micrometer mass median diameter having an upstream concentration of 70-120 mg/m$^3$. The aerosol was forced through a sample of filter media at a calibrated flow rate of 42.5 liters/minute (face velocity of 6.9 cm/s) with the aerosol TSI AFT Model 8130 aerosol neutralizer turned off. The total testing time was 23 seconds (rise time of 15 seconds, sample time of 4 seconds, and purge time of 4 seconds). Simultaneously with % Pen, the pressure drop (ΔP in mm of water) across the filter was measured by the instrument. The concentration of DOP aerosol was measured by light scattering both upstream and downstream of the filter media using calibrated photometers. The DOP % Pen is defined as: % Pen=100×(DOP concentration downstream/DOP concentration upstream). For each material, 6 separate measurements were made at different locations on the BMF web and the results were averaged.

The % Pen and ΔP were used to calculate a QF by the following formula:

$$QF = -\ln(\% \text{ Pen}/100)/\Delta P,$$

where ln stands for the natural logarithm. A higher QF value indicates better filtration performance and decreased QF values effectively correlate with decreased filtration performance.

X-ray Discharge Test

The Quality Factor and % Penetration of sample webs to be tested were determined prior to exposure to X-ray radiation using the test method described above. The Initial Quality Factor is designated as "QF$_0$". The sample web was exposed on each side to X-rays using the system described below, ensuring that the entire sample was uniformly exposed to the X-ray radiation. After X-ray exposure, the sample of filter media was tested again to measure its filter performance (QF and % Pen). The procedure was repeated until the filter performance reached a plateau value, indicating all of the sample's electrostatic charge had been neutralized. The % Penetration Ratio (% Pen Ratio) is also reported. The % Pen Ratio was calculated from the % Pen at 0 minutes and 60 minutes using the equation where ln stands for the natural logarithm:

$$\% \text{ Pen Ratio} = \frac{\ln(\% \text{ Pen}(0\min)/100)}{\ln(\% \text{ Pen}(60\min)/100)} \times 100\%.$$

X-ray exposure was carried out using a Baltograph 100/15 CP (Balteau Electric Corp., Stamford, Conn.) X-ray exposure system consisting of a constant potential end grounded generator rated at 100 KV at 10 mA with a beryllium window (0.75 mm inherent filtration) with an output of up to 960 Roentgen/min at 50 cm from the focal spot of 1.5 mm×1.5 mm was employed. The voltage was set to 80 KV with a corresponding current of 8 mA. A sample holder was set up at an approximate distance of 57.2 centimeters (22.5 inches) from the focal spot to produce an exposure of about 580 Roentgen/min.

Effective Charge Density Calculation:

The Effective Charge Density ($q_f$) for an electret filter fiber was calculated from filter penetration test measurements. The equation for filter penetration through an electret filter medium is related to three particle coefficients for mechanical, dipole and coulombic particle capture mechanisms.

$$\% P_{ch} = 100 \left[ \frac{\pi(1-\alpha)d_f}{4\alpha L} \right] (\eta_M + \eta_{In} + \eta_c),$$

Where:
$\eta_M$=single fiber efficiency: mechanical capture (uncharged fibers, uncharged particles)=
$\eta_{In}$=single fiber efficiency: induced dipole capture (charged fibers, uncharged particles)
$\eta_C$=single fiber efficiency: coulombic capture (charged fibers, charged particles)=0 for uncharged particles The induced force single fiber efficiency ($\eta_{In}$) may be calculated from the filter structure and the results of filter tests, using uncharged particles ($\eta_C$=0) for an electret filter medium, which give the penetration fraction for charged fibers ($P_{ch}$) and for uncharged fibers ($P_{unch}$):

$$\eta_{In} = \left[ \frac{\pi(1-\alpha)d_f}{4\alpha L} \right] \ln\left[ \frac{P_{ch}}{P_{unch}} \right]$$

The Induced Force Dimensionless Parameter ($K_{In}$) relates to the capture of uncharged particles with charged electret fibers.

$$K_{In} = \left[ \frac{\varepsilon_p - 1}{\varepsilon_p + 2} \right] \frac{C_c \pi^2 q_f^2 d_p^2}{6\varepsilon_0 (1+\varepsilon_f)^2 \mu d_f U_0}$$

Correlative relationships from computational analysis (below) from Otani (1993) and Brown (1993) for two regimes may be inverted to calculate the Induced Force Parameter, $K_{In}$, from $\eta_{In}$ with a correction ($h_k$) for the flow field around fibers. In the case of this study, $K_{In}$<1 and the first equation was used.

$\eta_{In} = 0.51 h_k^{-0.35} K_{In}^{0.73}$; $10^{-2} < K_{In} < 10^0$ $\eta_{In} = 0.54 h_k^{0.60} K_{In}^{0.40}$; $10^0 < K_{In} < 10^2$ $h_k = -\frac{1}{2} \ln \alpha + \alpha - \frac{1}{4}\alpha^2 - \frac{3}{4}$ Substituting the value from the calculation of $K_{In}$ from $\eta_{In}$ and inverting the equation for $K_{In}$ above gives the Effective Charge Density ($q_f$) of the fibers in an electret filter.

$$q_f = \left\{ \left[ \frac{\varepsilon_p + 2}{\varepsilon_p - 1} \right] \frac{6\varepsilon_0 (1+\varepsilon_r)^2 \mu d_f U_o K_{In}}{C_c \pi^2 d_p^2} \right\}^{0.5}$$

Where:
$\eta_{In}$=Induced dipole single fiber efficiency (–)
$d_f$=Fiber Diameter (m)=0.5×(Effective Fiber Diameter from airflow tests)
L=Filter thickness (m)
α=solidity (–)
$P_{ch}$=Penetration—charged fibers (–)
$P_{unch}$=Penetration—uncharged fibers (–)
$d_p$=Particle Diameter (m)=0.2 micrometer
$C_c$=Particle Cunningham Correction Factor (–)
$h_k$=Kuwabara hydrodynamic factor (–)
$q_f$=Effective Fiber Charge Density (C/m²)
$\varepsilon_p$=Dielectric Constant—Particle (–)=5.1 for dioctylphthalate
$\varepsilon_0$=Free Space Dielectric Constant=8.8542E-12 (C²/Nm²)
$\varepsilon_f$=Dielectric Constant—Fiber (–)=2.2 for polypropylene
μ=Air Viscosity Pa s=1.81E-05 (Ns/m²)
$U_0$=Face Velocity (m/s)=6.9 cm/s
$K_{In}$=Induced Dipole Force Parameter (–)

The input particle size distribution used from the TSI AFT Model 8130 aerosol generator has a geometric count mean diameter of 0.2 micrometers with a geometric standard deviation of 1.6.

The count median fiber diameter is used for the calculation of fiber charge. This is calculated as one-half the effective fiber diameter. The effective fiber diameter (EFD) is the surface area fiber diameter and can be related to the fiber count diameter by the Hatch-Choate equation:

$$d_g = \frac{d_a}{\exp(2\ln^2(\sigma_g))}$$

Where:
$d_g$=count geometric mean diameter=arithmetic median diameter
$d_a$=area geometric mean diameter=EFD
$\sigma_g$=geometric standard deviation Thermal Stability Analysis:

The thermal stability of each charging additive was measured with a Thermogravimetric Analyzer (TGA) Model 2950 available from TA Instruments, New Castle, Del. Approximately 5-10 milligrams of material was placed in the TGA and heated from room temperature to 500° C. at a rate of 10° C./min under an air environment while the weight loss was measured. Table 1 lists the temperature at which 2% weight loss was detected as well as the temperature at which 5% weight loss was detected.

TABLE 1

| Charging Additive | Temperature at 2% weight loss (° C.) | Temperature at 5% weight loss (° C.) |
| --- | --- | --- |
| 1 | 236 | 253 |
| 2 | 234 | 252 |
| 3 | 272 | 444 |
| 4 | 268 | 335 |
| 5 | 265 | 289 |

Examples 1-85 and Comparative Examples C1-C83

For each of the Examples and Comparative Examples, the procedures described below were followed. The data for these Examples are presented in Tables 2, 3 and 4.

Sample Preparation:

Step A—Preparation of Microfiber Webs:

For each Example Web 1-20, one of the charging additives described above (either Additive 1, 2, 3, or 4) was selected and dry blended with one of the grades of polypropylene or poly-4-methyl-1-pentene at the concentration shown in Table 2, and the blend was extruded as described in Van A. Wente, "Superfine Thermoplastic Fibers," Industrial Engineering Chemistry, vol. 48, pp. 1342-1346. The extrusion temperature ranged from about 250° C.-340° C. and the extruder was a BRABENDER conical twin-screw extruder (commercially available from Brabender Instruments, Inc.) operating at a rate of about 2.5 to 3 kg/hr (5-7 lb/hr). The die was 25.4 centimeters (10 inches) wide with 10 holes per centimeter (25 holes per inch). Melt blown microfiber (BMF) webs were formed having basis weights of about 57 g/m², effective fiber diameters of about 8.0 micrometers and a thickness of about 1 millimeter. Likewise, for each Comparative Example C1-C8, a BMF web was prepared from the same grade of polypropylene as the corresponding Examples web, but either no charge additive was added or the Charging Additive 5 was used. Table 2 summarizes the specific web characteristics for each of the Examples and Comparative Examples.

Step B—Electret Preparation:

Each of the BMF webs prepared in Step A above was charged by one of four electret charging methods: corona pre-treatment and hydrocharging with water containing 50 PPM $Na_2CO_3$; corona pre-treatment and hydrocharging with DI water; hydrocharging with water containing 50 PPM $Na_2CO_3$; or hydrocharging with DI water. Table 3 summarizes the specific charging method applied to each of the samples.

Charging Method 1:

The selected BMF webs prepared in Step A above were charged by DC corona discharge followed by hydrocharging with water containing 50 PPM $Na_2CO_3$. The corona charging was accomplished by passing the web on a grounded surface under a corona brush source with a corona current of about 0.01 milliamp per centimeter of discharge source length at a rate of about 3 centimeters per second. The corona source was about 3.5 centimeters above the grounded surface on which the web was carried. The corona source was driven by a positive DC voltage. After the corona charging, the BMF web was hydrocharged using a fine spray of water having 50 PPM $Na_2CO_3$ dissolved in it generated from a nozzle operating at a pressure of 896 kiloPascals (130 psig) and a flow rate of approximately 1.4 liters/minute. The selected BMF webs prepared in Step A were conveyed by a porous belt through the water spray at a speed of approximately 10 centimeters/second while a vacuum simultaneously drew the water through the web from below. Each BMF web was run through the hydrocharger twice (sequentially once on each side) while spraying, and then twice without spraying with just the vacuum to remove any excess water. The webs were allowed to dry completely in air overnight prior to filter testing.

Charging Method 2:

The selected BMF webs prepared in Step A above were charged by DC corona discharge followed by hydrocharging with DI water. The same method was used as in Charging Method 1 except DI water was used instead of water containing 50 PPM $Na_2CO_3$ dissolved in it.

Charging Method 3:

The selected BMF webs prepared in Step A above were charged by hydrocharging with water containing 50 PPM $Na_2CO_3$. The BMF web was hydrocharged using a fine spray of water having 50 PPM $Na_2CO_3$ dissolved in it generated from a nozzle operating at a pressure of 896 kiloPascals (130 psig) and a flow rate of approximately 1.4 liters/minute. The selected BMF webs prepared in Step A were conveyed by a porous belt through the water spray at a speed of approximately 10 centimeters/second while a vacuum simultaneously drew the water through the web from below. Each BMF web was run through the hydrocharger twice (sequentially once on each side) while spraying, and then twice without spraying with just the vacuum to remove any excess water. The webs were allowed to dry completely in air overnight prior to filter testing.

Charging Method 4:

The selected BMF webs prepared in Step A above were charged by hydrocharging with DI water. The BMF web was hydrocharged using a fine spray of DI water generated from a nozzle operating at a pressure of 896 kiloPascals (130 psig) and a flow rate of approximately 1.4 liters/minute. The selected BMF webs prepared in Step A were conveyed by a porous belt through the water spray at a speed of approximately 10 centimeters/second while a vacuum simultaneously drew the water through the web from below. Each BMF web was run through the hydrocharger twice (sequentially once on each side) while spraying, and then twice without spraying with just the vacuum to remove any excess water. The webs were allowed to dry completely in air overnight prior to filter testing.

Filtration Testing Procedure:

Initial Filtration Performance:

Each of the charged samples prepared in Step B above was cut into a 1 meter section, this section was tested in its initial state for % DOP aerosol penetration (% DOP Pen) and pressure drop (ΔP), and the Quality Factor (QF) was calculated as described in the Test Methods given above. These results are reported in Table 3 below as % DOP Pen, Pressure Drop and QF.

TABLE 2

| BMF Web Example number | Charge Additive | Resin Grade | Additive Concn. (wt %) | Eff. Fiber Diam. (μm) | Solidity (%) | Basis Weight (g/m²) | Thickness (mm) |
|---|---|---|---|---|---|---|---|
| C1 | None | PP-1 | 0 | 8.0 | 5.5 | 57 | 1.13 |
| 1 | 1 | PP-1 | 0.5 | 8.4 | 4.8 | 52 | 1.19 |
| 2 | 1 | PP-1 | 1 | 7.7 | 4.6 | 56 | 1.31 |
| 3 | 2 | PP-1 | 0.5 | 8.2 | 4.5 | 53 | 1.28 |
| 4 | 3 | PP-1 | 0.5 | 8.1 | 4.6 | 59 | 1.38 |
| 5 | 3 | PP-1 | 1 | 8.4 | 4.3 | 57 | 1.44 |
| 6 | 4 | PP-1 | 0.5 | 8.1 | 5.4 | 56 | 1.11 |
| 7 | 4 | PP-1 | 1 | 8.1 | 5.8 | 55 | 1.03 |
| C2 | 5 | PP-1 | 0.5 | 8.0 | 5.3 | 55 | 1.14 |
| C3 | 5 | PP-1 | 1 | 8.1 | 5.6 | 55 | 1.06 |
| C4 | None | PP-2 | 0 | 8.3 | 6.0 | 56 | 1.01 |
| 8 | 4 | PP-2 | 0.5 | 7.7 | 6.1 | 59 | 1.05 |

TABLE 2-continued

| BMF Web Example number | Charge Additive | Resin Grade | Additive Concn. (wt %) | Eff. Fiber Diam. (μm) | Solidity (%) | Basis Weight (g/m²) | Thickness (mm) |
|---|---|---|---|---|---|---|---|
| 9 | 4 | PP-2 | 1.0 | 7.9 | 5.9 | 62 | 1.15 |
| C5 | None | PP-3 | 0 | 8.1 | 5.4 | 60 | 1.20 |
| 10 | 4 | PP-3 | 0.1 | 7.9 | 5.9 | 58 | 1.09 |
| 11 | 4 | PP-3 | 0.2 | 8.3 | 6.1 | 60 | 1.08 |
| 12 | 4 | PP-3 | 0.5 | 8.2 | 6.1 | 60 | 1.08 |
| 13 | 4 | PP-3 | 0.75 | 8.1 | 6.2 | 57 | 1.01 |
| 14 | 4 | PP-3 | 1.0 | 7.9 | 6.1 | 59 | 1.04 |
| C6 | None | PP-4 | 0 | 7.6 | 5.4 | 56 | 1.14 |
| 15 | 4 | PP-4 | 0.5 | 7.8 | 6.4 | 60 | 1.01 |
| 16 | 4 | PP-4 | 1.0 | 7.7 | 6.4 | 56 | 0.96 |
| C7 | None | PP-5 | 0 | 8.3 | 56 | 7.1 | 0.85 |
| 17 | 4 | PP-5 | 0.5 | 7.7 | 58 | 7.5 | 0.85 |
| 18 | 4 | PP-5 | 1 | 7.5 | 57 | 6.7 | 0.93 |
| C8 | None | PMP-1 | 0 | 8.1 | 55 | 7.3 | 0.89 |
| 19 | 4 | PMP-1 | 0.5 | 9.3 | 58 | 7.8 | 0.88 |
| 20 | 4 | PMP-1 | 1 | 9.2 | 55 | 7.4 | 0.88 |

TABLE 3

| Example Number | Charge Additive | Additive concn. (wt %) | Resin Grade | BMF Web Example Number | Charging Method | % DOP Pen. | Pressure Drop (mm H₂O) | QF (1/mm H₂O) |
|---|---|---|---|---|---|---|---|---|
| 21 | 1 | 0.5 | PP-1 | 1 | 1 | 3.58 | 1.86 | 1.80 |
| C9 | None | None | PP-1 | C1 | 1 | 8.92 | 2.14 | 1.14 |
| 22 | 1 | 0.5 | PP-1 | 1 | 2 | 8.88 | 1.78 | 1.37 |
| C10 | None | None | PP-1 | C1 | 2 | 16.2 | 2.14 | 0.86 |
| 23 | 1 | 0.5 | PP-1 | 1 | 3 | 5.73 | 1.84 | 1.57 |
| C11 | None | None | PP-1 | C1 | 3 | 29.1 | 2.12 | 0.59 |
| 24 | 1 | 0.5 | PP-1 | 1 | 4 | 12.52 | 1.74 | 1.20 |
| C12 | None | None | PP-1 | C1 | 4 | 44.4 | 2.16 | 0.38 |
| 25 | 1 | 1 | PP-1 | 2 | 1 | 4.62 | 2.02 | 1.53 |
| C13 | None | None | PP-1 | C1 | 1 | 8.92 | 2.14 | 1.14 |
| 26 | 1 | 1 | PP-1 | 2 | 2 | 10.64 | 2.14 | 1.06 |
| C14 | None | None | PP-1 | C1 | 2 | 16.2 | 2.14 | 0.86 |
| 27 | 1 | 1 | PP-1 | 2 | 3 | 3.66 | 2.12 | 1.56 |
| C15 | None | None | PP-1 | C1 | 3 | 29.1 | 2.12 | 0.59 |
| 28 | 1 | 1 | PP-1 | 2 | 4 | 10.64 | 2.14 | 0.88 |
| C16 | None | None | PP-1 | C1 | 4 | 44.4 | 2.16 | 0.38 |
| 29 | 2 | 0.5 | PP-1 | 3 | 1 | 5.04 | 1.52 | 1.98 |
| C17 | None | None | PP-1 | C1 | 1 | 8.92 | 2.14 | 1.14 |
| 30 | 2 | 0.5 | PP-1 | 3 | 2 | 10.81 | 1.52 | 1.47 |
| C18 | None | None | PP-1 | C1 | 2 | 16.2 | 2.14 | 0.86 |
| 31 | 2 | 0.5 | PP-1 | 3 | 3 | 29.3 | 1.58 | 0.78 |
| C19 | None | None | PP-1 | C1 | 3 | 29.1 | 2.12 | 0.59 |
| 32 | 2 | 0.5 | PP-1 | 3 | 4 | 51.1 | 1.44 | 0.47 |
| C20 | None | None | PP-1 | C1 | 4 | 44.4 | 2.16 | 0.38 |
| 33 | 3 | 0.5 | PP-1 | 4 | 1 | 7.13 | 1.80 | 1.47 |
| C21 | None | None | PP-1 | C1 | 1 | 8.92 | 2.14 | 1.14 |
| 34 | 3 | 0.5 | PP-1 | 4 | 2 | 18.34 | 1.74 | 0.98 |
| C22 | None | None | PP-1 | C1 | 2 | 16.2 | 2.14 | 0.86 |
| 35 | 3 | 0.5 | PP-1 | 4 | 3 | 27.14 | 1.76 | 0.75 |
| C23 | None | None | PP-1 | C1 | 3 | 29.1 | 2.12 | 0.59 |
| 36 | 3 | 1 | PP-1 | 5 | 1 | 4.66 | 1.66 | 1.87 |
| C24 | None | None | PP-1 | C1 | 1 | 8.92 | 2.14 | 1.14 |
| 37 | 3 | 1 | PP-1 | 5 | 2 | 11.77 | 1.66 | 1.32 |
| C25 | None | None | PP-1 | C1 | 2 | 16.2 | 2.14 | 0.86 |
| 38 | 3 | 1 | PP-1 | 5 | 3 | 33.22 | 1.60 | 0.69 |
| C26 | None | None | PP-1 | C1 | 3 | 29.1 | 2.12 | 0.59 |
| 39 | 3 | 1 | PP-1 | 5 | 4 | 49.52 | 1.58 | 0.45 |
| C27 | None | None | PP-1 | C1 | 4 | 44.4 | 2.16 | 0.38 |
| 40 | 4 | 0.5 | PP-1 | 6 | 1 | 2.58 | 2.02 | 1.81 |
| C28 | None | None | PP-1 | C1 | 1 | 8.92 | 2.14 | 1.14 |
| C29 | 5 | 0.5 | PP-1 | C2 | 1 | 16.9 | 2.24 | 0.80 |
| 41 | 4 | 0.5 | PP-1 | 6 | 2 | 4.03 | 1.94 | 1.68 |
| C30 | None | None | PP-1 | C1 | 2 | 16.2 | 2.14 | 0.86 |
| C31 | 5 | 0.5 | PP-1 | C2 | 2 | 26.43 | 2.38 | 0.56 |
| 42 | 4 | 0.5 | PP-1 | 6 | 3 | 5.72 | 1.90 | 1.52 |
| C32 | None | None | PP-1 | C1 | 3 | 29.1 | 2.12 | 0.59 |
| C33 | 5 | 0.5 | PP-1 | C2 | 3 | 41.9 | 2.32 | 0.38 |
| 43 | 4 | 0.5 | PP-1 | 6 | 4 | 1.33 | 1.92 | 2.26 |
| C34 | None | None | PP-1 | C1 | 4 | 44.4 | 2.16 | 0.38 |
| C35 | 5 | 0.5 | PP-1 | C2 | 4 | 29.42 | 2.54 | 0.48 |

TABLE 3-continued

| Example Number | Charge Additive | Additive concn. (wt %) | Resin Grade | BMF Web Example Number | Charging Method | % DOP Pen. | Pressure Drop (mm H$_2$O) | QF (1/mm H$_2$O) |
|---|---|---|---|---|---|---|---|---|
| 44 | 4 | 1 | PP-1 | 7 | 1 | 3.11 | 2.08 | 1.69 |
| C36 | None | None | PP-1 | C1 | 1 | 8.92 | 2.14 | 1.14 |
| C37 | 5 | 1 | PP-1 | C3 | 1 | 35.3 | 2.10 | 0.50 |
| 45 | 4 | 1 | PP-1 | 7 | 2 | 3.66 | 1.98 | 1.67 |
| C38 | None | None | PP-1 | C1 | 2 | 16.2 | 2.14 | 0.86 |
| C39 | 5 | 1 | PP-1 | C3 | 2 | 27.3 | 2.18 | 0.60 |
| 46 | 4 | 1 | PP-1 | 7 | 3 | 4.48 | 1.96 | 1.59 |
| C40 | None | None | PP-1 | C1 | 3 | 29.1 | 2.12 | 0.59 |
| C41 | 5 | 1 | PP-1 | C3 | 3 | 43.8 | 2.18 | 0.38 |
| 47 | 4 | 1 | PP-1 | 7 | 4 | 0.79 | 2.14 | 2.29 |
| C42 | None | None | PP-1 | C1 | 4 | 44.4 | 2.16 | 0.38 |
| C43 | 5 | 1 | PP-1 | C3 | 4 | 29.88 | 2.26 | 0.54 |
| 48 | 4 | 0.5 | PP-2 | 8 | 1 | 1.79 | 2.53 | 1.61 |
| C44 | None | None | PP-2 | C4 | 1 | 27.1 | 2.08 | 0.63 |
| 49 | 4 | 0.5 | PP-2 | 8 | 2 | 1.25 | 2.55 | 1.78 |
| C45 | None | None | PP-2 | C4 | 2 | 40.08 | 1.77 | 0.52 |
| 50 | 4 | 0.5 | PP-2 | 8 | 3 | 2.28 | 2.63 | 1.45 |
| C46 | None | None | PP-2 | C4 | 3 | 54.32 | 1.98 | 0.31 |
| 51 | 4 | 0.5 | PP-2 | 8 | 4 | 0.41 | 2.52 | 2.21 |
| C47 | None | None | PP-2 | C4 | 4 | 70.87 | 1.97 | 0.18 |
| 52 | 4 | 1 | PP-2 | 9 | 1 | 1.14 | 2.63 | 1.70 |
| C48 | None | None | PP-2 | C4 | 1 | 27.1 | 2.08 | 0.63 |
| 53 | 4 | 1 | PP-2 | 9 | 2 | 0.52 | 2.55 | 2.08 |
| C49 | None | None | PP-2 | C4 | 2 | 40.08 | 1.77 | 0.52 |
| 54 | 4 | 1 | PP-2 | 9 | 3 | 2.39 | 2.37 | 1.60 |
| C50 | None | None | PP-2 | C4 | 3 | 54.32 | 1.98 | 0.31 |
| 55 | 4 | 1 | PP-2 | 9 | 4 | 0.32 | 2.47 | 2.35 |
| C51 | None | None | PP-2 | C4 | 4 | 70.87 | 1.97 | 0.18 |
| 56 | 4 | 0.1 | PP-3 | 10 | 1 | 3.51 | 2.56 | 1.37 |
| C52 | None | None | PP-3 | C5 | 1 | 4.51 | 2.54 | 1.23 |
| 57 | 4 | 0.1 | PP-3 | 10 | 2 | 5.73 | 2.36 | 1.23 |
| C53 | None | None | PP-3 | C5 | 2 | 8.55 | 2.56 | 0.96 |
| 58 | 4 | 0.1 | PP-3 | 10 | 3 | 26.34 | 2.4 | 0.56 |
| C54 | None | None | PP-3 | C5 | 3 | 42.34 | 2.42 | 0.36 |
| 59 | 4 | 0.1 | PP-3 | 10 | 4 | 8.17 | 2.36 | 1.07 |
| C55 | None | None | PP-3 | C5 | 4 | 32.82 | 2.58 | 0.43 |
| 60 | 4 | 0.2 | PP-3 | 11 | 1 | 3.78 | 2.20 | 1.50 |
| C56 | None | None | PP-3 | C5 | 1 | 4.51 | 2.54 | 1.23 |
| 61 | 4 | 0.2 | PP-3 | 11 | 2 | 5.12 | 2.22 | 1.34 |
| C57 | None | None | PP-3 | C5 | 2 | 8.55 | 2.56 | 0.96 |
| 62 | 4 | 0.2 | PP-3 | 11 | 3 | 28.44 | 2.24 | 0.56 |
| C58 | None | None | PP-3 | C5 | 3 | 42.34 | 2.42 | 0.36 |
| 63 | 4 | 0.2 | PP-3 | 11 | 4 | 5.56 | 2.24 | 1.32 |
| C59 | None | None | PP-3 | C5 | 4 | 32.82 | 2.58 | 0.43 |
| 64 | 4 | 0.5 | PP-3 | 12 | 1 | 8.23 | 1.60 | 1.57 |
| C60 | None | None | PP-3 | C5 | 1 | 4.51 | 2.54 | 1.23 |
| 65 | 4 | 0.5 | PP-3 | 12 | 2 | 10.51 | 1.70 | 1.33 |
| C61 | None | None | PP-3 | C5 | 2 | 8.55 | 2.56 | 0.96 |
| 66 | 4 | 0.5 | PP-3 | 12 | 3 | 41.48 | 1.56 | 0.57 |
| C62 | None | None | PP-3 | C5 | 3 | 42.34 | 2.42 | 0.36 |
| 67 | 4 | 0.5 | PP-3 | 12 | 4 | 19.82 | 1.72 | 0.95 |
| C63 | None | None | PP-3 | C5 | 4 | 32.82 | 2.58 | 0.43 |
| 68 | 4 | 0.75 | PP-3 | 13 | 1 | 2.43 | 2.34 | 1.60 |
| C64 | None | None | PP-3 | C5 | 1 | 4.51 | 2.54 | 1.23 |
| 69 | 4 | 0.75 | PP-3 | 13 | 2 | 5.40 | 2.22 | 1.32 |
| C65 | None | None | PP-3 | C5 | 2 | 8.55 | 2.56 | 0.96 |
| 70 | 4 | 0.75 | PP-3 | 13 | 3 | 7.64 | 2.34 | 1.10 |
| C66 | None | None | PP-3 | C5 | 3 | 42.34 | 2.42 | 0.36 |
| 71 | 4 | 0.75 | PP-3 | 13 | 4 | 1.46 | 2.16 | 1.99 |
| C67 | None | None | PP-3 | C5 | 4 | 32.82 | 2.58 | 0.43 |
| 72 | 4 | 1.0 | PP-3 | 14 | 1 | 3.30 | 2.24 | 1.54 |
| C68 | None | None | PP-3 | C5 | 1 | 4.51 | 2.54 | 1.23 |
| 73 | 4 | 1.0 | PP-3 | 14 | 2 | 5.38 | 2.42 | 1.22 |
| C69 | None | None | PP-3 | C5 | 2 | 8.55 | 2.56 | 0.96 |
| 74 | 4 | 1.0 | PP-3 | 14 | 3 | 9.35 | 2.26 | 1.06 |
| C70 | None | None | PP-3 | C5 | 3 | 42.34 | 2.42 | 0.36 |
| 75 | 4 | 1.0 | PP-3 | 14 | 4 | 1.69 | 2.34 | 1.79 |
| C71 | None | None | PP-3 | C5 | 4 | 32.82 | 2.58 | 0.43 |
| 76 | 4 | 0.5 | PP-4 | 15 | 4 | 0.42 | 2.96 | 1.94 |
| C72 | None | None | PP-4 | C6 | 4 | 12.38 | 2.6 | 0.81 |
| 77 | 4 | 1.0 | PP-4 | 16 | 4 | 0.14 | 3.07 | 2.15 |
| C73 | None | None | PP-4 | C6 | 4 | 12.38 | 2.6 | 0.81 |
| 78 | 4 | 0.5 | PP-5 | 17 | 4 | 0.68 | 2.84 | 1.77 |
| C74 | None | None | PP-5 | C7 | 4 | 35.66 | 2.26 | 0.46 |
| 79 | 4 | 1.0 | PP-5 | 18 | 4 | 0.289 | 3.0 | 1.96 |
| C75 | None | None | PP-5 | C7 | 4 | 35.66 | 2.26 | 0.46 |

TABLE 3-continued

| Example Number | Charge Additive | Additive concn. (wt %) | Resin Grade | BMF Web Example Number | Charging Method | % DOP Pen. | Pressure Drop (mm H$_2$O) | QF (1/mm H$_2$O) |
|---|---|---|---|---|---|---|---|---|
| 80 | 4 | 0.5 | PMP-1 | 19 | 4 | 6.17 | 2.06 | 1.36 |
| C76 | None | None | PMP-1 | C8 | 4 | 14.98 | 2.16 | 0.88 |
| 81 | 4 | 1.0 | PMP-1 | 20 | 4 | 3.55 | 2.18 | 1.54 |
| C77 | None | None | PMP-1 | C8 | 4 | 14.98 | 2.16 | 0.88 |
| C78 | 4 | 1.0 | PP-1 | 7 | none | 79.9 | 2.1 | 0.11 |
| 82 | 4 | 1.0 | PP-1 | 7 | 4 | 3.4 | 2 | 1.69 |
| C79 | 1 | 1.0 | PP-1 | 2 | none | 72.7 | 2.1 | 0.15 |
| 83 | 1 | 1.0 | PP-1 | 2 | 4 | 4.88 | 2.3 | 1.31 |
| C80 | 5 | 1.0 | PP-1 | C3 | none | 71.5 | 1.8 | 0.19 |
| C81 | 5 | 1.0 | PP-1 | C3 | 4 | 40.8 | 1.9 | 0.47 |
| C82 | 3 | 1.0 | PP-1 | 5 | none | 81.1 | 1.7 | 0.12 |
| 84 | 3 | 1.0 | PP-1 | 5 | 4 | 8.56 | 1.8 | 1.37 |
| C83 | 2 | 0.5 | PP-1 | 3 | none | 81.5 | 1.7 | 0.12 |
| 85 | 2 | 0.5 | PP-1 | 3 | 4 | 2.32 | 2 | 1.88 |

X-Ray Discharge of Electret Filter Media:

Using the procedure described in the test methods above, selected samples of filter media were exposed to ionizing X-rays. Table 4 reports the filtration performance of each sample prior to exposure to X-rays (time=0 minutes), after 30 minutes of total X-ray exposure, after 40 minutes of total X-ray exposure, and after 60 minutes of total X-ray exposure.

What is claimed is:

1. An electret web comprising:
  a thermoplastic resin; and
  a charge-enhancing additive comprising a heterocyclic imide material which is free of fluorinated groups.

2. The electret web of claim 1 wherein the heterocyclic imide material which is free of fluorinated groups comprises at least one material with the structure (a), (b), or (c), or any combination thereof:

TABLE 4

Filtration Performance after Exposure to X-rays

| | Exposure = 0 min | | | Exposure = 30 min | | | Exposure = 40 min | | | Exposure = 60 min | | | |
|---|---|---|---|---|---|---|---|---|---|---|---|---|---|
| Ex. No. | ΔP (mm H$_2$O) | % Pen (%) | QF$_0$ (1/mm H$_2$O) | ΔP (mm H$_2$O) | % Pen | QF (1/mm H$_2$O) | ΔP (mm H$_2$O) | % Pen (%) | QF (1/mm H$_2$O) | ΔP (mm H$_2$O) | % Pen (%) | QF (1/mm H$_2$O) | % Pen Ratio (%) |
| C78 | 2.1 | 79.9 | 0.11 | 2 | 79.5 | 0.11 | 2 | 79.5 | 0.11 | 2 | 79.3 | 0.12 | 97 |
| 82 | 2 | 3.4 | 1.69 | 2 | 42.7 | 0.43 | 2 | 57.2 | 0.28 | 2 | 73.7 | 0.15 | 1108 |
| C79 | 2.1 | 72.7 | 0.15 | 2.1 | 76.9 | 0.13 | 2.2 | 77.3 | 0.12 | 2.1 | 77.5 | 0.12 | 125 |
| 83 | 2.3 | 4.88 | 1.31 | 2.3 | 47.3 | 0.33 | 2.3 | 64.1 | 0.19 | 2.3 | 73 | 0.14 | 960 |
| C80 | 1.8 | 71.5 | 0.19 | 1.8 | 78.5 | 0.13 | 1.8 | 76.9 | 0.15 | 1.9 | 79.6 | 0.12 | 147 |
| C81 | 1.9 | 40.8 | 0.47 | 1.9 | 78.1 | 0.13 | 2 | 78.4 | 0.12 | 1.9 | 79.6 | 0.12 | 393 |
| C82 | 1.7 | 81.1 | 0.12 | 1.7 | 80.5 | 0.13 | 1.7 | 79.6 | 0.13 | 1.7 | 81.3 | 0.12 | 101 |
| 84 | 1.8 | 8.56 | 1.37 | 1.6 | 79.7 | 0.14 | 1.7 | 80.5 | 0.13 | 1.6 | 80.8 | 0.13 | 1153 |
| C83 | 1.7 | 81.5 | 0.12 | 1.7 | 83.6 | 0.11 | 1.7 | 82.8 | 0.11 | 1.7 | 82.4 | 0.11 | 106 |
| 85 | 2 | 2.32 | 1.88 | 1.8 | 69.6 | 0.20 | 1.8 | 74.8 | 0.16 | 1.9 | 81.1 | 0.11 | 1797 |

Effective Charge Density Calculation:

Using the data presented in Table 4 above for 60 minute X-ray exposure and the procedure described in the test methods above, the effective charge density was calculated for selected samples of filter media. These data are presented in Table 5.

TABLE 5

| Ex. No. | L (mm) | BW (g/m$^2$) | U$_0$ (cm/s) | α | h$_K$ | d$_{eff}$ (μm) | QF Initial (mm H$_2$O)$^{-1}$ | η$_{In}$ | K$_{in}$ | q$_f$ (μC/m$^2$) |
|---|---|---|---|---|---|---|---|---|---|---|
| 82 | 1.03 | 55 | 6.9 | 0.058 | 0.731 | 8.1 | 1.69 | 0.154 | 0.167 | 61.6 |
| 83 | 1.31 | 56 | 6.9 | 0.046 | 0.835 | 7.7 | 1.31 | 0.134 | 0.146 | 56.2 |
| C81 | 1.06 | 55 | 6.9 | 0.056 | 0.746 | 8.1 | 0.47 | 0.034 | 0.021 | 21.9 |
| 84 | 1.44 | 57 | 6.9 | 0.043 | 0.866 | 8.4 | 1.37 | 0.114 | 0.120 | 53.3 |
| 85 | 1.28 | 53 | 6.9 | 0.045 | 0.845 | 8.2 | 1.88 | 0.190 | 0.238 | 74.0 |

(a)

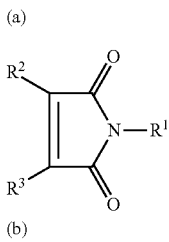

(b)

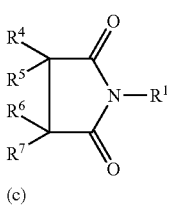

(c)

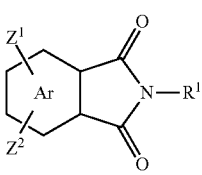

wherein the group $R^1$ comprises a hydrogen atom, an alkyl, an aryl, a heteroalkyl, a substituted alkyl, substituted aryl, or a group containing a heterocyclic imide group;
the groups $R^2$ and $R^3$ independently comprise a hydrogen atom, an alkyl, an aryl, a heteroalkyl, a substituted alkyl, substituted aryl, or a group containing a heterocyclic imide group; and
the groups $R^4$, $R^5$, $R^6$, and $R^7$ independently comprise a hydrogen atom, an alkyl, an aryl, a heteroalkyl, a substituted alkyl, substituted aryl, or a group containing a heterocyclic imide group;
Ar comprises an aromatic ring; and
each $Z^1$ and $Z^2$ is independently a substituent on the aromatic ring located at any position on the ring and comprises a hydrogen atom, an alkyl, an aryl, a heteroalkyl, a substituted alkyl, a substituted aryl, a nitro group, or a group containing a heterocyclic imide.

3. The electret web of claim 1 wherein the heterocyclic imide material which is free of fluorinated groups comprises at least one material with the structure (d), (e), (f), or (g) or any combination thereof:

(d)

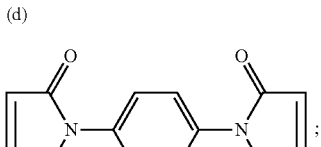

(e)

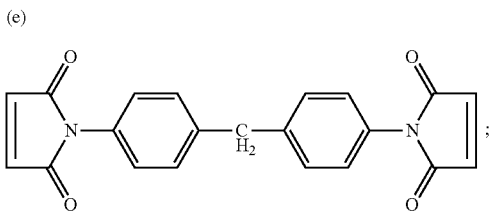

(f)

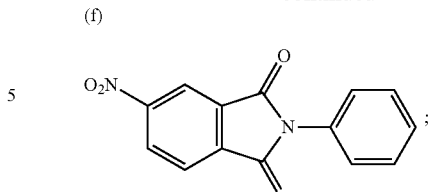

(g)

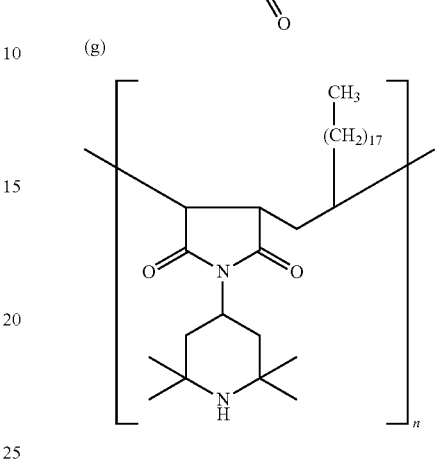

where n is a number from about 5-7.

4. An electret filter medium comprising:
a non-woven microfiber web comprising a blend of:
a thermoplastic resin; and
a charge-enhancing additive comprising a heterocyclic imide material which is free of fluorinated groups.

5. The electret filter medium of claim 4 wherein the heterocyclic imide material which is free of fluorinated groups comprises at least one material with the structure (a), (b), or (c), or any combination thereof:

(a)

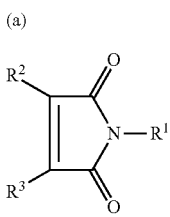

(b)

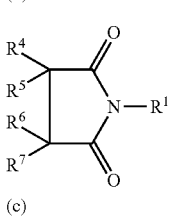

(c)

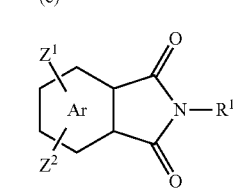

wherein the group $R^1$ comprises a hydrogen atom, an alkyl, an aryl, a heteroalkyl, a substituted alkyl, substituted aryl, or a group containing a heterocyclic imide group;

the groups $R^2$ and $R^3$ independently comprise a hydrogen atom, an alkyl, an aryl, a heteroalkyl, a substituted alkyl, substituted aryl, or a group containing a heterocyclic imide group; and the groups $R^4$, $R^5$, $R^6$, and $R^7$ independently comprise a hydrogen atom, an alkyl, an aryl, a heteroalkyl, a substituted alkyl, substituted aryl, or a group containing a heterocyclic imide group;

Ar comprises an aromatic ring; and each $Z^1$ and $Z^2$ is independently a substituent on the aromatic ring located at any position on the ring and comprises a hydrogen atom, an alkyl, an aryl, a heteroalkyl, a substituted alkyl, a substituted aryl, a nitro group, or a group containing a heterocyclic imide.

6. The electret filter medium of claim 4 wherein the heterocyclic imide material which is free of fluorinated groups comprises at least one material with the structure (d), (e), (f), or (g) or any combination thereof:

(d)
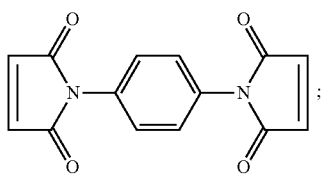

(e)
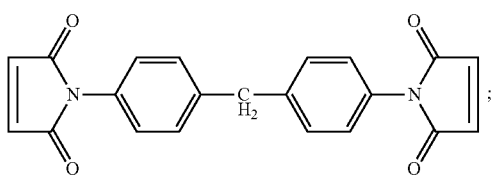

(f)
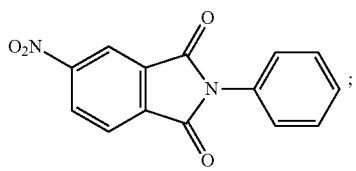

(g)
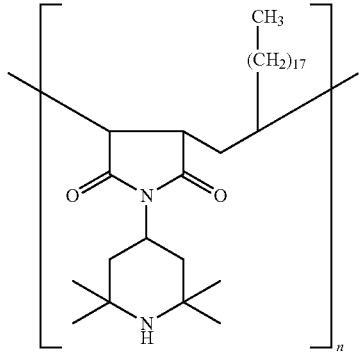

where n is a number from about 5-7.

7. The electret filter medium of claim 4 wherein the nonwoven microfiber web comprises: polyolefin; polyvinyl chloride; polystyrene; polycarbonate; or polyester.

8. The electret filter medium of claim 4 wherein the nonwoven microfiber web comprises: polypropylene; poly(4-methyl-1-pentene); copolymers of propylene and 4-methyl-1-pentene; or mixtures thereof.

9. The electret filter medium of claim 4 wherein the heterocyclic imide material which is free of fluorinated groups comprises 0.1-5.0% by weight of the web.

10. The electret filter medium of claim 4 wherein the web contains a charge, wherein the charge is imparted through tribocharging, hydrocharging, DC corona treatment, or a combination thereof.

11. The electret filter medium of claim 10 wherein the web has sufficient electrostatic charge to exhibit filtration performance as measured by QF of 0.3 (mm of $H_2O)^{-1}$ or greater at a face velocity of 6.9 centimeters per second.

12. The electret filter medium of claim 4 wherein the filter medium comprises:

a respirator filter, a room ventilation system filter, a vehicle ventilation system filter, an air conditioner filter, a furnace filter, a room air purifier filter, a vacuum cleaner filter, or a computer disk drive filter.

13. The electret filter medium of claim 4 wherein the filter medium in combination with a respirator assembly is a component of a respiratory device designed to be used by a person.

14. The electret filter medium of claim 4 wherein the filter medium has a % Penetration Ratio of at least 300% at a face velocity of 6.9 centimeters per second when tested according to the X-ray Discharge Test.

15. The electret filter medium of claim 4 wherein the filter medium has an Initial Quality Factor of at least 0.3 (mm of $H_2O)^{-1}$ at a face velocity of 6.9 centimeters per second, and after exposure to X-rays for 60 minutes, a Quality Factor of less than 50% of the Initial Quality Factor, when tested according to the X-ray Discharge Test.

16. The electret filter medium of claim 4 wherein the filter medium has a calculated effective charge density of at least 20 microcoloumbs per square meter.

17. A method of preparing an electret web comprising:

providing a thermoplastic material;

providing a charge-enhancing additive comprising a heterocyclic imide material which is free of fluorinated groups;

hot melt mixing the thermoplastic material and the charge-enhancing additive to yield a thermoplastic blend;

forming a web; and electrostatically charging the web.

18. The electret web of claim 17 wherein forming a web comprises forming a non-woven fibrous web.

19. The method of claim 17 wherein the heterocyclic imide material which is free of fluorinated groups comprises at least one material with the structure (a), (b), or (c), or any combination thereof:

(a)
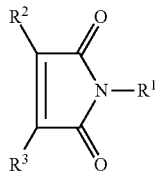

-continued

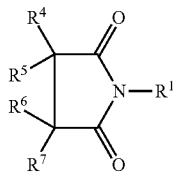
(b)

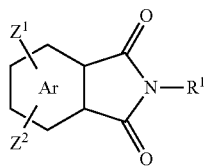
(c)

wherein the group $R^1$ comprises a hydrogen atom, an alkyl, an aryl, a heteroalkyl, a substituted alkyl, substituted aryl, or a group containing a heterocyclic imide group;

the groups $R^2$ and $R^3$ independently comprise a hydrogen atom, an alkyl, an aryl, a heteroalkyl, a substituted alkyl, substituted aryl, or a group containing a heterocyclic imide group; and the groups $R^4$, $R^5$, $R^6$, and $R^7$ independently comprise a hydrogen atom, an alkyl, an aryl, a heteroalkyl, a substituted alkyl, substituted aryl, or a group containing a heterocyclic imide group;

Ar comprises an aromatic ring; and each $Z^1$ and $Z^2$ is independently a substituent on the aromatic ring located at any position on the ring and comprises a hydrogen atom, an alkyl, an aryl, a heteroalkyl, a substituted alkyl, a substituted aryl, a nitro group, or a group containing a heterocyclic imide.

20. The method of claim 17 wherein the thermoplastic material comprises:
polypropylene; poly(4-methyl-1-pentene); copolymers of propylene and 4-methyl-1-pentene; and mixtures thereof.

* * * * *

UNITED STATES PATENT AND TRADEMARK OFFICE
CERTIFICATE OF CORRECTION

PATENT NO. : 8,790,449 B2
APPLICATION NO. : 13/262165
DATED : July 29, 2014
INVENTOR(S) : Fuming Li et al.

Page 1 of 1

It is certified that error appears in the above-identified patent and that said Letters Patent is hereby corrected as shown below:

In the specification,

Column 7
Line 25, Delete "Farrel" and insert -- Farrell --, therefor.

Column 13
Line 49, Delete "hexamethylendiamine" and insert -- hexamethylenediamine --, therefor.

Column 15
Line 55, Delete "$0.54h_k^{0.60}$" and insert -- $0.54h_k^{-0.60}$ --, therefor.

In the claim,

Column 28
Line 39, In Claim 16, delete "microcoloumbs" and insert -- microcoulombs --, therefor.

Signed and Sealed this
Twenty-eighth Day of April, 2015

Michelle K. Lee
*Director of the United States Patent and Trademark Office*